Figure 1:
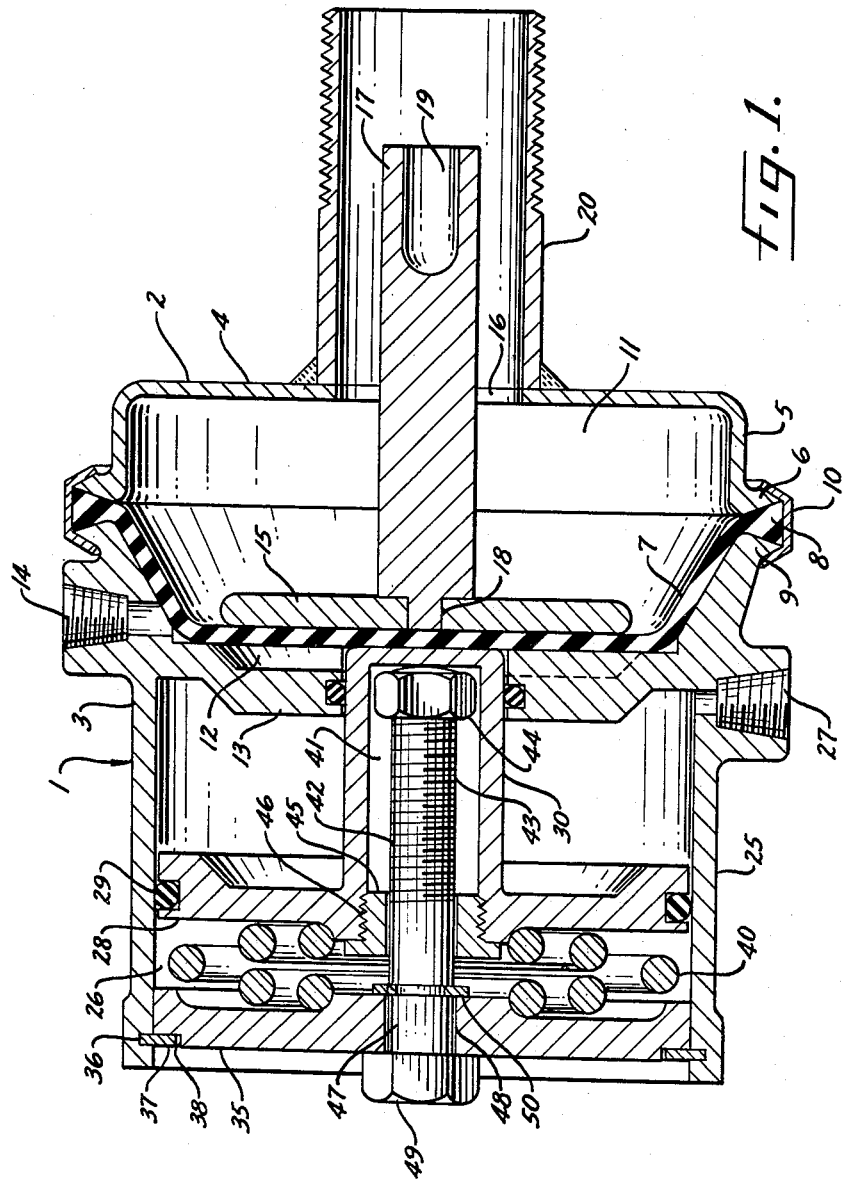

Jan. 14, 1964

H. L. DOBRIKIN 3,117,496

SAFETY BRAKE CHAMBER

Filed Dec. 1, 1959

2 Sheets-Sheet 1

INVENTOR.
Harold L. Dobrikin,
BY Parker & Carter
Attorneys.

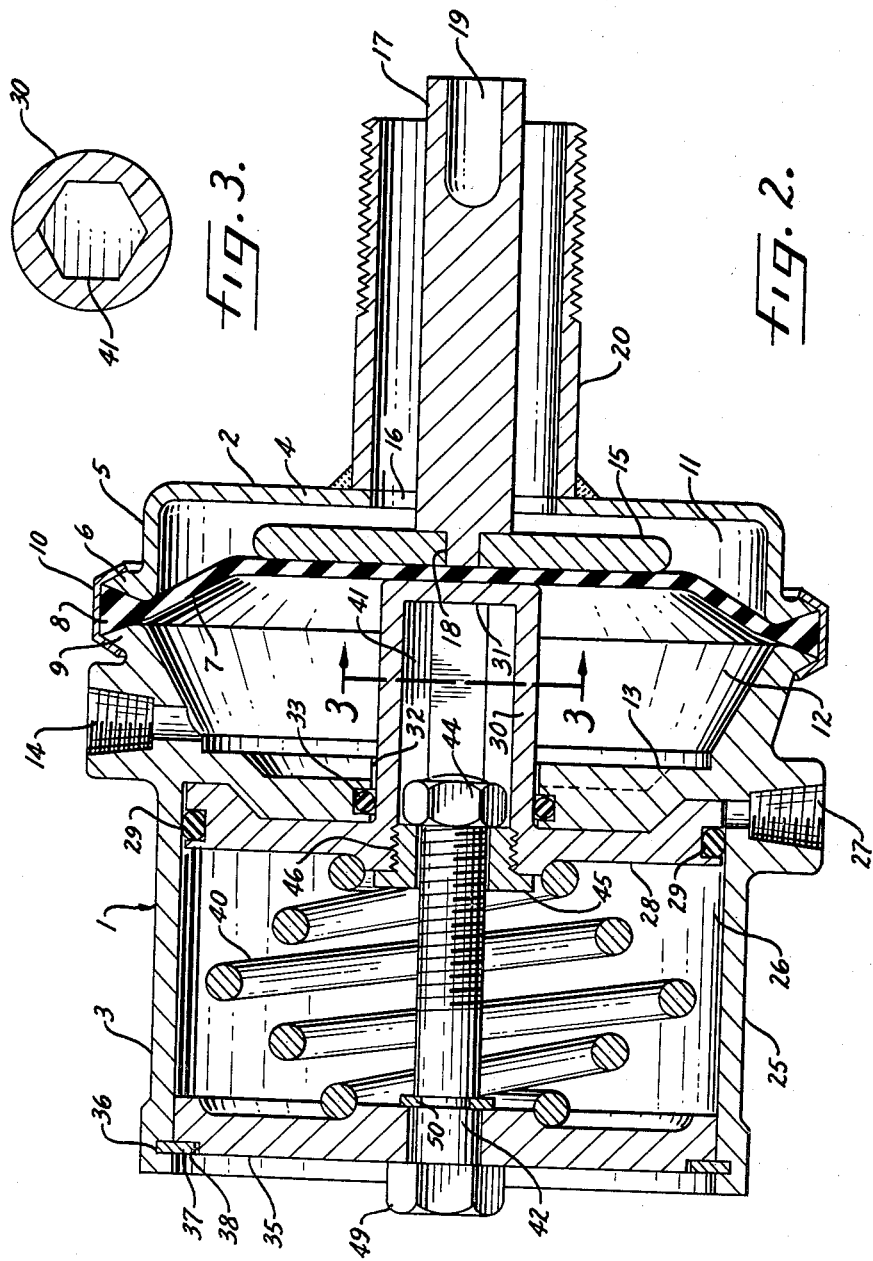

United States Patent Office 3,117,496
Patented Jan. 14, 1964

3,117,496
SAFETY BRAKE CHAMBER
Harold L. Dobrikin, Chicago, Ill., assignor to Berg Airlectro Products Company, Chicago, Ill., a corporation of Illinois
Filed Dec. 1, 1959, Ser. No. 856,412
10 Claims. (Cl. 92—63)

This invention relates to fluid pressure chambers and has particular relation to devices known as brake chambers usable on vehicles such as trucks and the like.

One purpose of the invention is to provide a brake chamber having incorporated therein automatic safety application means.

Another purpose is to provide a brake chamber having automatic means effective to cause brake application upon loss of pressure in a vehicle emergency pressure system.

Another purpose is to provide an air brake chamber incorporating means for automatically actuating said chamber toward brake-applying condition in response to loss of pressure in an emergency air system of a vehicle to which the brake chamber is applied.

Another purpose is to provide a brake chamber having simplified mechanism for emergency application of vehicle brakes.

Another purpose is to provide an air brake chamber having integral brake-applying means.

Another puropse is to provide an air brake chamber having brake-applying means designed for ease of adjustment and replacement of said brake-applying means.

Other purposes will appear from time to time during the course of the specification and claims.

I illustrate my invention more or less diagrammatically in the accompanying drawings wherein:

FIGURE 1 is a side view in partial cross section;
FIGURE 2 is a view similar to that of FIGURE 1 and illustrating the parts in another position; and
FIGURE 3 is a view taken on the line 3—3 of FIGURE 2.

Like parts are indicated by like numerals throughout the specification and drawings.

Referring now to the drawings and particularly to FIGURE 1 thereof, the numeral 1 indicates generally the brake chamber of my invention. The chamber 1 may be formed of housing parts 2, 3. Housing portion 2 may take the form of a hemispherical shell having a rear wall 4, a circumferential wall 5 and an annular outwardly extendling lip 6 at the end of wall 5.

A flexible diaphragm 7 divides the housing 1 into two portions. The diaphragm 7 has a peripheral enlargement 8 overlying and in contact with an annular surface of the flange 6. Housing part 3 has an annular end flange 9 of equal diameter with the flange 6. A securing ring 10 clamps diaphragm enlargement 8 between flanges 6 and 9. Within the housing 1 a chamber 11 is formed between one surface of diaphragm 7 and the wall 4 of housing part 2. A chamber 12 is formed between the opposite surface of diaphragm 7 and an internal fixed wall 13. A passage 14 is formed in housing part 3 and communicates with chamber 12 in housing 1. A plate 15 is positioned in chamber 11. Wall 4 of housing part 2 is centrally apertured as at 16 for extension therethrough of actuating arm or rod 17, one end of which is connected to a rear face of plate 15 as at 18. It will be understood that rod 17 is suitably connected, as is well known, to brake actuating mechanism, the opposite end of rod 17 being slotted as at 19 for this purpose. A tubular enclosure 20 surrounds the outwardly extending end of rod 17. The brake mechanism referred to is arranged to urge the plate 15 against diaphragm 7 as illustrated in FIGURE 1.

Housing part 3 has a circumferential cylindrical portion 25 extending in the opposite direction from wall 13 from the direction of extension of rod 17 and tubular part 20. The portion 25 includes a chamber 26. A passage 27 penetrates circumferential wall 25 and communicates with the chamber 26 on the opposite side of wall 13 from chamber 12. A piston 28 is reciprocably mounted in circumferential portion 25 and carries a sealing member such as the O-ring 29 in engagement with the inner circumferential surface of circumferential wall 25. The chamber 26 is thus formed between one surface of piston 28 and wall 13.

Piston 28 carries an axial extension 30 of substantially reduced diameter from that of piston 28 and having a closed end wall 31. The wall 13 is apertured as at 32 to permit extension therethrough of the distal end of member 30, a seal such as O-ring 33 being provided in aperture 32 for sealing engagement with the outer circumferential wall of member 30.

A closure plate 35 is secured within the circumferential wall 25 adjacent the rear open end thereof. A groove 36 formed in the inner circumferential surface of wall 25 adjacent its outer end portion receives a split-ring 37, a portion of which seats in an inwardly offset portion 38 of closure plate 35. A yielding member such as the spring 40 is positioned between and has its opposite ends operatively engaging the opposed surfaces of plate 35 and piston 28.

The portion 30 has an inner bore 41 the walls of which are arranged in hexagonal form. A rotatable adjustment member 42 has its distal threaded end 43 extending through the bore 41 and engaging therein a hexagonal nut 44, the sides of which engage the walls of hex-bore 41. A bushing 45 is threadably engaged in the aperture 46 formed in piston 28 in alignment with bore 41. Member 42 has a circumferential portion 47 rotatably mounted in an aperture or a bore 48 formed in the plate 35 and member 42 carries an operable fixed head 49 positioned outwardly of and in engagement with the outer surface of plate 35. A split ring 50 positions member 42 by engaging a groove formed therein and by seating against the inner surface of plate 35 about aperture 48.

Whereas I have described and claimed an operative device, I wish it to be understood that this showing is to be taken in an illustrative or diagrammatic sense. There are many modifications of the invention that will fall within the scope of the invention that will be apparent to those skilled in the art. For example, the elements to the right, as the parts are shown in the drawing, of wall element 13, comprising a service chamber, and those to the left thereof, comprising an emergency chamber could be separately arranged and connected without departing from the nature and scope of the invention. The scope of the invention, therefore, should be limited only by the scope of the hereinafter appended claims.

The use and operation of my invention are as follows:

The brake chamber of my invention is normally employed in connection with the brake system of a vehicle such as a truck in which air is employed under pressure to apply the brakes. The normal air pressure service line is connected to passage 14. When it is desired to apply the brakes the vehicle operator actuates a valve effective to apply service pressure through passage 14 to chamber 12 of my invention. Pressure applied in chamber 12 operates against diaphragm 7 to urge it and the plate 15 and rod 17 toward the housing portion 2 or to the right, as the parts are shown in FIGURE 1, thus applying the brakes through appropriate mechanism attached to rod 17.

The emergency air pressure of the vehicle brake system is applied to chamber 26 through passage 27. So long as emergency air is maintained at a predetermined level in chamber 26, piston 28 is held against the action of spring 40 in the position illustrated, for example, in FIGURE 1, the wall 31 of extension 30 being just in contact with the diaphragm 7 when pressure is lacking from chamber 12.

If pressure is lost from the emergency brake system, as by a leak or damage to said system, the spring 40 is effective to move the piston 28 and portion 30 thereof toward the chamber 11 in the housing 1 and thus to move the diaphragm 7 and plate 15 and rod 17 toward brake-applying position, or to the right as the parts are shown in FIGURE 1, in the same manner as would normally be accomplished by service air pressure entering chamber 12 through passage 14 in response to action of the vehicle operator. Thus the brakes are applied automatically and immediately upon the loss of emergency air pressure.

Adjustment of my invention is achieved by mere rotation of the head 49, the threaded portion 43 of member 42, while being rotatable, is in fixed linear position and rotation thereof in hex-nut 44 causes longitudinal movement of the nut 44 within the hexagonal bore 41 and along member 42. For example, the nut 44 may be moved rearwardly from the position illustrated in FIGURE 1 thus serving as a stop means limiting the movement of piston 28 toward brake-applying position.

The entire operative elements enclosed within circumferential wall 25 may be easily and simply removed for repairs or replacement. Even with the diaphragm 7 in the position illustrated in FIGURE 1, for example, the entire structure comprising the plate 35, spring 40 and piston 28 may be pushed inwardly for the short distance necessary to permit the ring 37 to be removed from groove 36, after which the entire structure comprising plate 35, spring 40, members 42 and 44 and piston 28 may be slidably removed outwardly through and replaced through the open end of cylindrical wall 25.

By turning head 49, through employment of any suitable tool, the operator retracts member 44 to compress spring 40 between piston 28 and plate 35 which serves as an abutment for spring 40, the elements 49, 42, 45, 30 and 44 thus serving as means for retaining the spring 40 against outward explosion when the openable end of the cylinder defined by cylindrical wall 25 is opened.

Similarly, while the retaining means above-described might, as indicated, be employed as adjustment means for the excursion of piston 28, the elements are so designed that such travel is normally predetermined. As will be readily apparent from the drawing, the retaining means described may be employed to release the brake in the absence of fluid pressure between piston 28 and wall element 13. By rotating head 49 in abutment plate 35, the pressure sealed movable member 28, which is shown as a piston, but which, as above indicated may be an equivalent element such as a diaphragm, is retracted and the brakes operated by member 17 are released.

As will be immediately apparent from the drawing, the coils of spring 40 are of varying diameters. While the diameters of said coils are shown as greater adjacent the axial midpoint of the spring and lesser at its opposite ends, it will be realized that said coil diameters may be varied in a number of ways while maintaining a difference in diameter between the diameters of the end coils and the coil adjacent said mid-point.

The spring 40 is productive of numerous advantageous results in achieving the numerous purposes of the invention. The device illustrated in the drawings is, in the art, mounted directly upon brackets fixed on a vehicle axle without cushioning and is therefore subject to all of the road shocks and vibration to which the axle is subjected. In addition, the undercarriage areas of such vehicles, for example, truck-trailers, are crowded for space, it being necessary to maintain sufficient road and rear clearance to avoid contact with obstructions, fractions of an inch often controlling the installation or non-installation of items in such areas. Further, the total weight of the vehicle is limited by law and any weight added to the vehicle reduces the pay-load capacity thereof. The device of the invention, however, must develop the powerful forces necessary to stop the vehicle promptly upon occurrence of the emergency requiring such stop. The spring 40 is fully productive of such forces while enabling a reduction in total weight of the unit of approximately twenty-five percent in comparison with known units of similar capacity. Further, the employment of spring 40 with its varying diameters permissive of nesting some of the coils thereof when the spring is compressed is productive of substantial reductions in axial length in comparison with units of similar capacity employing uniform coil diameter springs.

The employment of coil-spring 40 having varying diameters, while productive of reduced weight and axial length, additionally produces a dissipation of its forces at a non-uniform overall rate through its excursion. As the spring 40 expands toward operating member 17 to apply the brakes of a vehicle, the brake elements of the vehicle wheel are moved first through a slack range before the brakes are actually applied. So far as brake application is concerned, the ultimate function of the device, the slack range, while universally present in the field of the device, is substantially irrelevant. The critical, or "brake-applying" range during the excursion of spring 40 and movable member 28, is that portion at some point in which the brakes are applied. With properly adjusted brake elements, the brakes will be applied at the very beginning of such normal brake-applying range. As the brake elements become worn, the point of brake application will move down said range and will occur later in the excursion through said range. I find that the spring of the invention loses its force at a greater amount per unit of excursion through the slack range (approximately the first third) of its excursion than during the remainder thereof. Since the loss of force through the critical brake-applying range occurs at a lesser rate, less force being lost per unit of excursion, the amount of force available at the point of brake application is greater than that produced by a spring having a uniform rate. A uniform-rate spring suitable for incorporation in the environment of the invention would, in order to produce the desired forces, have such a high, continuous, uniform dissipation of force that the loss rate of its force through the operating range, being identical to its loss rate through the slack range, would be greater and the force available at a point of brake application would be less.

Unequal application of braking forces to individual wheels can produce a loss of directional stability and jack-knifing of a truck-trailer vehicle, for example, may result from such loss of directional stability. The phenomenon described in relation to the spring and structure of the invention is effective to reduce the disparity between the amount of braking forces applied to individual wheel brake-elements, the extent of wear of which is different. Thus, the device of the invention, with the lower loss rate of its forces across the brake-applying range of operation, is productive of greater safety in its application to individual vehicle wheels.

I claim:
1. In a brake-operating device a housing, an apertured annular wall element dividing said housing into a service chamber and an emergency chamber, a diaphragm dividing said service chamber, a brake-operating member in contact with at least one side of said diaphragm and extending from said service chamber, a piston reciprocal in said emergency chamber, said piston having a portion extending from said emergency chamber to move said brake-operating member, a fluid pressure inlet communicating with said service chamber and positioned to deliver fluid pressure to the opposite side of said diaphragm, a coil spring in said emergency chamber positioned to urge said piston toward operating engagement with said brake-operating member, a second fluid pressure inlet communicating with said emergency chamber and positioned to deliver fluid pressure to said piston to urge said piston away from operating engagement with said brake-operating member, said spring having a plurality of coils, the diameter of the coils at the opposite ends of said spring being less than the diameter of the coil adjacent the mid-point of said spring.

2. A brake-operating unit comprising a substantially cylindrical wall, a removable annular dish-shaped end wall, a fixed annular wall, a centrally-apertured, removable flat abutment plate, said annular walls and plate being axially spaced along said cylindrical wall to form therewithin a service chamber and an emergency chamber, a diaphragm dividing said service chamber, a brake-operating member in contact with at least one side of said diaphragm and extending outwardly in one direction from said service chamber, a piston reciprocal in said emergency chamber, said piston having a portion extending outwardly in the same direction from said emergency chamber to move said brake-operating member, a fluid pressure inlet communicating with said service chamber and positioned to deliver fluid pressure to the opposite side of said diaphragm, a coil spring in said emergency chamber in contact with said plate and piston and positioned to urge said piston toward operating engagement with said brake-operating member, said spring having coils of varying diameters, the end coils of said spring each being less in diameter than the coil adjacent the mid-point of said spring, a second fluid pressure inlet communicating with said emergency chamber and positioned to deliver fluid pressure to said piston to urge said piston away from operating engagement with said operating member, and at least one threaded member rotatably engaged in said plate and positioned to retain said plate in contact with said coil spring when said plate of said emergency chamber is removed.

3. A brake-operating structure comprising an emergency cylinder having an openable end and a centrally apertured fixed wall adjacent its opposite end, a dish-shaped member removably secured to an end of said cylinder, a diaphragm clamped between said dish-shaped member and said last-named cylinder end to form a service chamber, a brake-operating member operatively engaged with said diaphragm and extending from said service chamber, a piston reciprocal in said cylinder and having an elongated tubular axial extension, said extension extending through the aperture in said fixed wall toward operating engagement with said brake-operating member, a centrally apertured plate removably positioned adjacent said openable end of said cylinder, a coil spring positioned between and having its opposite ends in contact with said plate and piston to urge said piston and extension toward operating engagement with said brake-operating member, said coil spring having coils of varying diameters, the coil adjacent the mid-point of said spring having a diameter greater than the coils at the opposite ends of said spring and a rod-like threaded retaining means rotatably engaged in said plate and positioned to retain said spring under compression when said openable end is open.

4. In a brake-operating device, a housing having therein a pair of axially aligned chambers, a diaphragm in said housing, a rod in said housing and extending axially therefrom for actuating connection with a brake mechanism, said diaphragm being in operating contact with one end of said rod within said housing, inlet means for supplying fluid pressure to one side of said diaphragm to operate said rod and alternate means for operating said rod, said alternate means including a piston in said housing, an extension on said piston positioned for operating contact with said rod, and a coil spring for moving said piston to operate said rod, said spring being formed of a plurality of coils of varying diameters, the coils of said spring increasing from one end thereof toward the mid-point thereof and decreasing from said mid-point toward the opposite end of said spring, a plate-like member removably positioned in said housing and retainer means threadably engaging said plate-like member to hold said spring between said piston and said plate-like member when one end of said housing is open.

5. An auxiliary spring-powered emergency actuator for a pneumatic brake actuator of the type comprising a diaphragm clamped between a housing and an end cap, and defining with said end cap a diaphragm actuator chamber, a brake actuator push rod extending through a central aperture in the housing and having a head bearing against said diaphragm, said auxiliary actuator comprising: a cylinder integral with said end cap and projecting rearwardly therefrom in coaxial, opposed relation to said housing; a piston slidable in said cylinder; a bulkhead, constituted by the central portion of said end cap, cooperating with said piston and cylinder to define a piston retracting pressure chamber and separating the latter from said diaphragm actuator chamber, said bulkhead having means defining a central aperture; a tubular piston stem having a rear end secured to said piston and a forward end projecting into said aperture for transmitting pressure to the center of said diaphragm; a rear end cap secured to the rear end of said cylinder in opposed relation to said piston; compression spring means engaged under compression between said piston and said rear end cap; means for admitting to said piston retracting pressure chamber, the air pressure utilized in actuating said diaphragm, for moving said piston to a retracted position in which said spring means is compressed; a tie rod having a rear end secured to the center of said rear end cap, said tie rod extending through the piston and into said tubular stem and having a head at its forward end; and means within said one end of said stem providing an abutment against which said tie rod head will engage to limit the separation of said piston and rear end cap under the expansive force of said spring means when said air pressure is released from said piston retracting pressure chamber.

6. An actuator as defined in claim 5, wherein said abutment is in the form of an annular shoulder.

7. An actuator as defined in claim 5, including a nut having a tubular part threaded into the rear end of said stem and providing said annular abutment means at its forward end, said tie rod extending axially through said nut.

8. A spring-powered auxiliary actuator for a pneumatic brake actuator of the type including a diaphragm and an end cap cooperatively defining an air brake chamber, and a brake actuator push rod engaged by said diaphragm and extending forwardly therefrom for brake actuation when said diaphragm responds to air pressure in said chamber, said auxiliary actuator comprising: a cylinder secured to said end cap and projecting rearwardly therefrom; a piston slidable in said cylinder, said end cap comprising a bulkhead cooperating with said piston and cylinder to define a piston-retracting pressure chamber and separating the latter from said diaphragm-actuator chamber, said bulkhead having means defining a central aperture; a tubular piston stem having a rear end secured to said piston and a forward end projecting into said aperture for transmitting pressure to the center of the diaphragm; said cylinder having a rear end member in opposed relation to said piston; compression spring means engaged under compression between said piston and said rear end member; means for admitting air under pressure to said piston retracting chamber for retracting said piston and compressing said springs; a tie rod having a rear end portion secured to said rear end member, extending into said tubular stem and having a head at its forward end; an abutment means near the rear end of said stem, engageable with said tie rod head to limit the forward movement of said piston away from said rear end member under the expansive force of said spring means when air pressure is released from said piston-retracting chamber.

9. A spring-powered auxiliary actuator for a pneumatic brake actuator of the type including a diaphragm and an end cap cooperatively defining an air brake chamber, and a brake actuator push rod engaged by said diaphragm and extending forwardly therefrom for brake actuation when said diaphragm responds to air pressure in said chamber, said auxiliary actuator comprising: a cylinder secured to said end cap and projecting rearwardly therefrom; a piston slidable in said cylinder, said end cap including a bulkhead portion cooperating with said piston and cylinder to define a piston-retracting pressure chamber and separating the latter from said diaphragm-actuator chamber, said bulkhead portion having a central aperture; a tubular piston stem having a rear end secured to said piston and a forward end projecting into said aperture for transmitting pressure to the center of the diaphragm; said cylinder having a rear end member in opposed relation to said piston; compression spring means having its opposite ends in operative engagement with said piston and said rear end member; means for admitting air under pressure to said piston retracting chamber for retracting said piston and compressing said spring means; a tie member, extending into said tubular stem and having a head movable along said tie member in response to rotation of said tie member; an abutment means near the rear end of said stem engageable with said tie rod head to limit the forward movement of said piston away from said rear end member under the expansive force of said spring means when air pressure is released from said piston-retracting chamber.

10. A spring-powered auxiliary actuator for a pneumatic brake actuator of the type including a diaphragm and an end cap cooperatively defining an air brake chamber, and a brake actuator push rod engaged by said diaphragm and extending forwardly therefrom for brake actuation when said diaphragm responds to air pressure in said chamber, said auxiliary actuator comprising: a cylinder secured to said end cap and projecting rearwardly therefrom; a piston slidable in said cylinder, said end cap including a bulkhead portion cooperating with said piston and cylinder to define a piston-retracting pressure chamber and separating the latter from said diaphragm-actuator chamber, said bulkhead portion having a central aperture; a tubular piston stem having a rear end secured to said piston and a forward end projecting into said aperture for transmitting pressure to the center of the diaphragm; said cylinder having a rear end member in opposed relation to said piston; compression spring means positioned in said piston-retracting pressure chamber to urge said piston away from said rear end member; means for admitting air under pressure to said piston retracting chamber for retracting said piston and compressing said spring means; a tie member rotatably mounted in said rear end member and extending into said tubular stem, and a head carried by said tie member and movable along said tie member toward said rear end member in response to rotation of said tie member in one direction to limit the expansion of said spring means, said head being movable along said tie member away from said rear end member in response to rotation of said tie member in the opposite direction to permit expansion of said spring means upon release of air pressure from said piston-retracting chamber.

References Cited in the file of this patent
UNITED STATES PATENTS

| | | |
|---|---|---|
| 1,120,377 | Dusinberre | Dec. 8, 1914 |
| 1,151,858 | Brock | Aug. 31, 1915 |
| 1,164,134 | Stansell et al. | Dec. 14, 1915 |
| 1,213,457 | Candler | Jan. 23, 1917 |
| 1,242,474 | Riley | Oct. 9, 1917 |
| 1,571,044 | DaCosta | Jan. 26, 1926 |
| 1,577,864 | Leavitt | Mar. 23, 1926 |
| 1,605,424 | Boothroyd | Nov. 2, 1926 |
| 1,774,836 | Lormuller | Sept. 2, 1930 |
| 1,787,614 | Christensen | Jan. 6, 1931 |
| 1,997,807 | Bird | Apr. 16, 1935 |
| 2,015,374 | Baker | Sept. 24, 1935 |
| 2,059,069 | Weiss | Oct. 27, 1936 |
| 2,116,046 | Schmutz | May 3, 1938 |
| 2,144,853 | Roy | Jan. 24, 1939 |
| 2,160,565 | Savio | May 30, 1939 |
| 2,239,348 | Wirtanen et al. | Apr. 22, 1941 |
| 2,241,374 | Alfieri | May 13, 1941 |
| 2,282,615 | Spalding | May 12, 1942 |
| 2,308,261 | Bartlett et al. | Jan. 12, 1943 |
| 2,346,868 | Perry | Apr. 18, 1944 |
| 2,373,259 | Price | Apr. 10, 1945 |
| 2,393,524 | Fant | Jan. 22, 1948 |
| 2,456,712 | Kremiller | Dec. 21, 1948 |
| 2,467,517 | Ayers | Apr. 19, 1949 |
| 2,508,806 | Tann et al. | May 23, 1950 |
| 2,532,462 | Rockwell | Dec. 5, 1950 |
| 2,597,650 | Maehren | May 20, 1952 |
| 2,658,347 | Stelzer | Nov. 10, 1953 |
| 2,661,598 | Thomas | Dec. 8, 1953 |
| 2,695,500 | Price | Nov. 30, 1954 |
| 2,736,294 | Buehner | Feb. 28, 1956 |
| 2,754,805 | Beman | July 17, 1956 |
| 2,809,723 | Howze | Oct. 15, 1957 |
| 2,848,980 | Almond | Aug. 26, 1958 |
| 2,854,954 | Howze | Oct. 7, 1958 |
| 2,859,959 | Hardigg | Nov. 11, 1958 |
| 2,877,745 | Ingres | Mar. 17, 1959 |
| 2,878,646 | Edge et al. | Mar. 24, 1959 |
| 2,905,199 | Cook | Sept. 22, 1959 |
| 2,933,160 | Van Wart et al. | Apr. 19, 1960 |
| 2,992,630 | Leighton et al. | July 18, 1961 |

UNITED STATES PATENT OFFICE
CERTIFICATE OF CORRECTION

Patent No. 3,117,496                              January 14, 1964

Harold L. Dobrikin

It is hereby certified that error appears in the above numbered patent requiring correction and that the said Letters Patent should read as corrected below.

Column 7, line 23, for "time" read -- tie --.

Signed and sealed this 16th day of June 1964.

(SEAL)
Attest:

ERNEST W. SWIDER                            EDWARD J. BRENNER
Attesting Officer                                Commissioner of Patents